(12) United States Patent
Ghose et al.

(10) Patent No.: US 8,838,271 B2
(45) Date of Patent: Sep. 16, 2014

(54) DETECTION OF NUCLEAR SPILLS USING SWARM OPTIMIZATION ALGORITHMS

(75) Inventors: Debasish Ghose, Bangalore (IN); Joseph Thomas, Bangalore (IN); Kaipa N. Krishnanand, Bangalore (IN)

(73) Assignee: Indian Institute of Science, Karnataka (IN)

(*) Notice: Subject to any disclaimer, the term of this patent is extended or adjusted under 35 U.S.C. 154(b) by 389 days.

(21) Appl. No.: 13/390,662

(22) PCT Filed: Nov. 29, 2010

(86) PCT No.: PCT/IB2010/055469
§ 371 (c)(1),
(2), (4) Date: Feb. 15, 2012

(87) PCT Pub. No.: WO2012/049537
PCT Pub. Date: Apr. 19, 2012

(65) Prior Publication Data
US 2012/0232695 A1    Sep. 13, 2012

(30) Foreign Application Priority Data
Oct. 14, 2010  (IN) .......................... 3045/CHE/2010

(51) Int. Cl.
*G01T 7/00*   (2006.01)
*G01T 1/00*   (2006.01)

(52) U.S. Cl.
CPC .......................... *G01T 7/00* (2013.01)
USPC ........................................ 700/248

(58) Field of Classification Search
CPC .................... G05D 1/02; G01T 1/00
USPC ................................ 700/248, 258
See application file for complete search history.

(56) References Cited

U.S. PATENT DOCUMENTS

| | | | |
|---|---|---|---|
| 6,842,674 B2 | 1/2005 | Solomon | |
| 6,904,335 B2 | 6/2005 | Solomon | |
| 7,047,861 B2 | 5/2006 | Solomon | |
| 7,343,222 B2 | 3/2008 | Solomon | |
| 2004/0030448 A1 | 2/2004 | Solomon | |
| 2004/0030449 A1 | 2/2004 | Solomon | |
| 2004/0030450 A1 | 2/2004 | Solomon | |
| 2004/0030451 A1* | 2/2004 | Solomon | ....................... 700/245 |

(Continued)

FOREIGN PATENT DOCUMENTS

| | | |
|---|---|---|
| AU | 2003272193 | 1/2004 |
| AU | 2003262893 | 3/2004 |

(Continued)

OTHER PUBLICATIONS

Krishnan and, K. N. et al., 'Glowworm-inspired Robot Swarm for Simultaneous Taxis towards Multiple Radiation Sources', Proceedings of the 2006 IEEE International Conference on Robotics and Automation, Orlando, Florida, May 2006.

(Continued)

*Primary Examiner* — Ian Jen
(74) *Attorney, Agent, or Firm* — Brundidge & Stanger, P.C.

(57) ABSTRACT

Systems and methods are provided for localizing a radiation or chemical source utilizing a swarm of robotic devices. According to one example, a robotic device will attempt to localize a source by measuring the concentration of source particles in air, and operating in a Chemotactic state, an Anemotactic state, or a Spiraling state.

15 Claims, 11 Drawing Sheets

(56) References Cited

U.S. PATENT DOCUMENTS

| | | | |
|---|---|---|---|
| 2004/0030570 A1* | 2/2004 | Solomon | 705/1 |
| 2004/0030571 A1 | 2/2004 | Solomon | |
| 2004/0068351 A1 | 4/2004 | Solomon | |
| 2004/0068415 A1 | 4/2004 | Solomon | |
| 2004/0068416 A1 | 4/2004 | Solomon | |
| 2004/0134336 A1 | 7/2004 | Solomon | |
| 2004/0134337 A1 | 7/2004 | Solomon | |
| 2004/0162638 A1 | 8/2004 | Solomon | |
| 2005/0183569 A1 | 8/2005 | Solomon | |
| 2005/0251291 A1 | 11/2005 | Solomon | |
| 2010/0286824 A1 | 11/2010 | Solomon | |
| 2011/0117202 A1* | 5/2011 | Bourke et al. | 424/490 |

FOREIGN PATENT DOCUMENTS

| | | |
|---|---|---|
| EP | 1534591 | 8/2004 |
| EP | 1563348 | 8/2005 |
| WO | 2004018158 | 3/2004 |
| WO | 2004003680 | 8/2004 |

OTHER PUBLICATIONS

Hardin, C. et al., 'A Modified Particle Swarm Algorithm for Robotic Mapping of Hazardous Environments', Proceedings of the World Automation Congress, Jun. 28-Jul. 1, 2004, vol. 17, pp. 31-36.

Reich, J. et al., 'Robot-Sensor Networks for Search and Rescue', IEEE International Workshop on Safety, Security and Rescue Robotics, Aug. 2006.

Krishnanand, K. N. et al., 'A Network Robot System for MUltiple Odor Source, Localization using Glowworm Swarm Optimization Algorithm' [retrieved on Apr. 27, 2011] Retrieved from the Internet <URL: http://guidance.aero.iisc.emetin/varuniNRS.PDF> published May 31, 2007 as per front page of document.

Odell, J. et al., 'Swarming Pattern Detection in Sensor and Robot Networks', 10th international Conference on Robotics and Remote Systems for Hazardous Environments, Gainesville, Florida, Mar. 28-21, 2004 [retrieved on Apr. 27, 2011] Retrieved from the internet <URL: http://users.isr.ist.utl.pt/~jseq/ResearchAtelier/papers/parunak-ANS04.pdf>.

K.N. Krishnanand and D. Ghose. (2009). Glowworm swarm optimization for simultaneous capture of multiple local optima of multimodal functions. Swarm Intelligence, 3(2): 87-124.

K.N. Krishnanand and D. Ghose. (2008). Theoretical foundations for rendezvous of glowworm-inspired agent swarms at multiple locations. Robotics and Autonomous Systems, 56(7): 549-569.

K.N. Krishnanand and D. Ghose (2009). Glowworm swarm optimisation: a new method for optimising multi-modal functions. International Journal of Computational Intelligence Studies, 1(1): 93-119.

K.N. Krishnanand and D. Ghose. (2006). Glowworm swarm based optimization algorithm for multimodal functions with collective robotics applications. Multi-agent and Grid Systems, 2(3): 209-222.

K.N. Krishnanand and D. Ghose. Glowworm swarm optimization for multimodal search spaces. Handbook of Swarm Intelligence—Concepts, Principles and Applications, Springer-Verlag (2011).

K.N. Krishnanand and D. Ghose (2009). Glowworm swarm optimization for searching higher dimensional spaces, Innovations in Swarm Intelligence, Springer-Verlag, pp. 61-75.

K.N. Krishnanand and D. Ghose. (2009). A glowworm swarm optimization based multi-robot system for signal source localization. Design and Control of Intelligent Robotic Systems, Springer-Verlag, pp. 49-68.

K.N. Krishnanand and D. Ghose. (2008). Glowworm swarm optimization algorithm for hazard sensing in ubiquitous environments using heterogeneous agent swarms. Soft Computing Applications in Industry, Springer-Verlag, vol. 226, 2008, pp. 165-187.

K.N. Krishnanand and D. Ghose.(2005). Detection of multiple source locations using a glowworm metaphor with applications to collective robotics. IEEE Swarm Intelligence Symposium, Pasadena, California, USA, pp. 84-91.

K.N. Krishnanand and D. Ghose. (2005). Multimodal function optimization using a glowworm metaphor with applications to collective robotics. Second Indian International Conference on Artificial Intelligence (IICAI 05), Pune, India, pp. 328-346.

K.N. Krishnanand and D. Ghose. (2006). Theoretical foundations for multiple rendezvous of glowworm-inspired mobile agents with variable local-decision domains. American Control Conference, Minneapolis, Minnesota, USA, pp. 3588-3593.

K.N. Krishnanand, P. Amruth, M.H. Guruprasad, Sharschchandra V. Bidargaddi, and D. Ghose. (2006). Glowworm-inspired robot swarm for simultaneous taxis towards multiple radiation sources. IEEE International Conference on Robotics and Automation (ICRA 06), Orlando, Florida, USA, pp. 958-963.

K.N. Krishnanand and D. Ghose. (2006). Glowworm-inspired swarms with adaptive local-decision domains for multimodal function optimization. IEEE Swarm Intelligence Symposium, Indianapolis, Indiana, USA.

K.N. Krishnanand and D. Ghose. (2007). Chasing multiple mobile signal sources: A glowworm swarm optimization approach. Third Indian International Conference on Artificial Intelligence, Pune, India.

K.N. Krishnanand and D. Ghose. (2007). Glowworm swarm optimization algorithm for hazard sensing in ubiquitous environments. International Conference on Ubiquitous Information Technologies and Applications Dubai, UAE, pp. 1499-1501.

P. Amruth, K.N. Krishnanand, and D. Ghose. (2007). Glowworms-inspired multirobot system for multiple source localization tasks. Workshop on Multi-robot Systems for Societal Applications, International Joint Conference on Artificial Intelligence (IJCAI 07), Hyderabad, India, pp. 32-37.

K.N. Krishnanand, P. Amruth, M.H. Guruprasad, S.V. Bidargaddi, and D. Ghose. (2006). Rendezvous of glowworm-inspired robot swarms at multiple source locations: A sound source based real-robot implementation. Ant Colony Optimization and Swarm Intelligence (Eds. M. Dorigo et al.), Lecture Notes in Computer Science, Springer Verlag, Berlin, Germany, LNCS 4317: 259-269.

International Search Report for corresponding PCT, May 6, 2011.

Joseph Thomas and Debasish Ghose, Strategies for Locating Multiple Odor Sources using Glowworm Swarm Optimization, Indian Institute of Science, Bangalore, India, IICAI, p. 842-861, 2009.

* cited by examiner

DETECTION OF NUCLEAR SPILLS USING SWARM OPTIMIZATION ALGORITHMS

CROSS-REFERENCE TO RELATED APPLICATION

The present application claims priority under 35 U.S.C. §119(d) to a corresponding patent application filed in India and having application number 3045/CHE/2010, filed on Oct. 14, 2010, the entire contents of which are herein incorporated by reference. The present application is a U.S. National Phase Application pursuant to 35 U.S.C. 371 of International Application No. PCT/IB10/055469, filed on Nov. 29, 2010, the entire contents of which are herein incorporated by reference.

TECHNICAL FIELD

This application relates generally to methods and systems for nuclear waste source localization.

BACKGROUND

Unless otherwise indicated herein, the materials described in this section are not prior art to the claims in this application and are not admitted to be prior art by inclusion in this section.

The urgency of nuclear spill localization can be illustrated by the havoc caused by certain well-known wide scale nuclear disasters, such as Chernobyl, Kyshtym, Windscale, and Three Mile Island (so named based on their locations). For example, a meltdown at the Chernobyl Nuclear Power Plant in Ukraine resulted in a cloud of radiation being released into the atmosphere. This radioactive fallout, carried by the wind, was found on sheep in The United Kingdom, clothing worn by people across Europe, and even in rainwater in the United States. Potential victims located near these "sources" may experience several times the maximum amount of gamma rays that nuclear workers are allowed to receive in an entire year.

Radioactive scrap found in junkyards is another potential source of nuclear contamination. For example, a scrapped radiography machine may contain several thousand pinhead pellets of cobolt-60. A break in the machine could lead to exposure of these pellets and the potential for the pellets to become pulverized, and mixed with the other metal scrap.

Exposure to these sources may lead to genetic damage and/or cancer. As a result, a need exists for autonomous first responder systems with capabilities to localize and contain nuclear spills in a variety of environments.

SUMMARY

In accordance with one embodiment, a method for searching for a radiation source is provided. The method includes measuring a concentration of radioactive particles, determining a luciferin value based on the measured concentration of radioactive particles, determining a number of robotic devices that comprise a neighbor set of robotic devices, and determining to operate in a Chemotactic state, an Anemotactic state, or a Spiraling state, based on the determined luciferin value and the determined number of other robotic devices that comprise the neighbor set.

In another embodiment, software instructions are provided for determining in which state to operate. The instructions include determining a luciferin value based on a measured concentration of radioactive particles, determining a number of robotic devices that comprise a neighbor set of robotic devices, and based on the determined luciferin value and the determined number of robotic devices that comprise a neighbor set of robotic devices, determining to operate in a Chemotactic state, an Anemotactic state, or a Spiraling state.

In a further embodiment, a robotic device is provided. The robotic device includes a computing device, memory storage, and instructions stored in the memory storage, which when executed by the computing device, cause the robotic device to measure a concentration of radioactive particles, determine a luciferin value based at least in part on the measured concentration of radioactive particles, determine a number of other robotic devices that comprise a neighbor set of robotic devices, and based on the determined luciferin value and the determined number of robotic devices that comprise a neighbor set of robotic devices, operate in a Chemotactic state, an Anemotactic state, or a Spiraling state.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
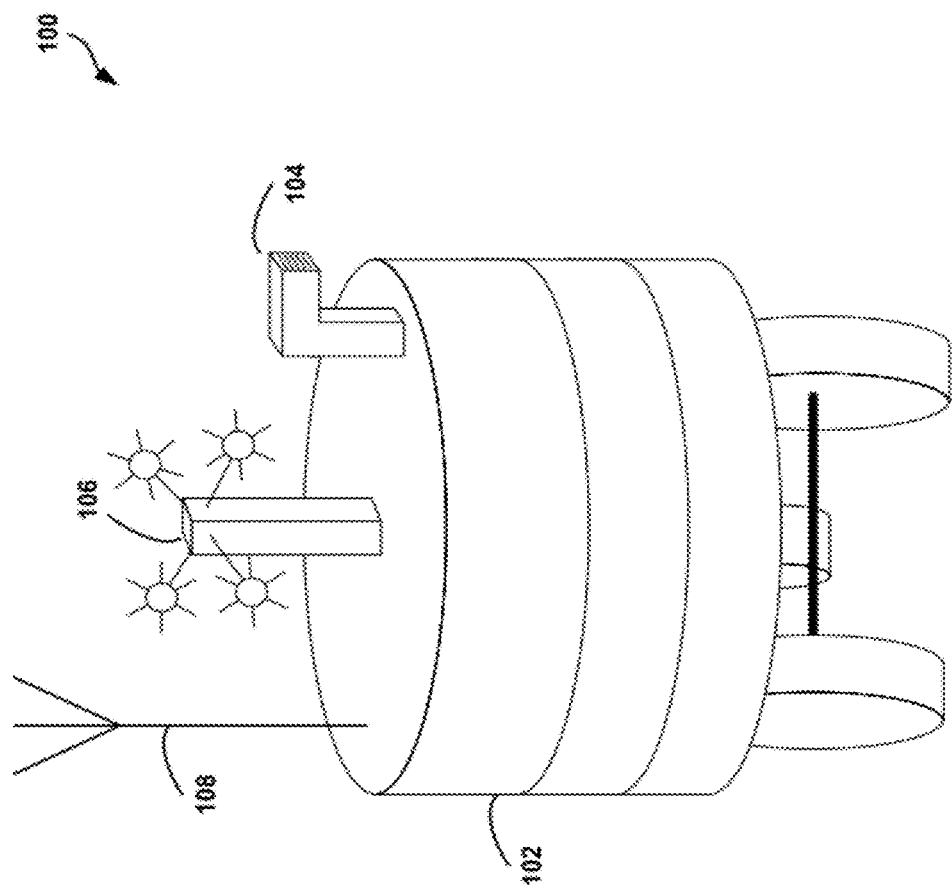
FIG. 1 is an illustration of an example robotic device that may carry out at least some of the embodiments presented herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Disclosed herein are algorithms and corresponding systems for detecting and locating odor sources in a variety of environments. Odor source detection may refer to the detection of chemicals or other particles in the air or water resulting from toxic gas leaks, forest fires, leaks in pressurized gas systems, chemical discharge in water bodies, mines and explosives, and radiation.

One algorithm, referred to as the glowworm swarm optimization (GSO) algorithm, employs a swarm (i.e., more than one) of autonomous robots that communicate various measurement and location specifics amongst themselves. Deploying a swarm of communicating robots at a site rather than a single robot, allows each individual robot to benefit from learning the measurements taken at various locations around the site by the other robots of the swarm. Each robot can base movement decisions on measurement values received from other robots of the swarm. This may result in faster convergence to the source than when only a single robot is deployed.

An example robot 100 that may be employed, in a swarm and execute the GSO algorithm is illustrated in FIG. 1. The size of robot 100 may vary considerably and depend upon the environment in which the robot is deployed. Generally, as the size of robot 100 increases, the maximum speed at which robot 100 moves increases as well. Therefore, the ideal size of the robot 100 is mainly influenced by the relative size of the application site. For example, a nuclear spill application may have a target site ranging from a few square meters (e.g., in a waste disposal area or in a building) to hundreds of square meters (e.g., in a nuclear power plant and vicinity). An example size of robot 100 may be on the order of 12 centimeters in diameter and 15 centimeters in height.

The robot 100 can use any general means of locomotion (e.g., wheeled locomotion or tracked locomotion), which naturally will depend on the application environment. Robot 100 is shown having body area 102 which may enclose batteries, circuitry, and other computing devices that can support the functional operations of robot 100. Such computing devices will he described with respect to FIG. 2. Robot 100 may also include a detector or "sniffer" 104 that is appropriate for the application. For example, in a nuclear spill application, sniffer 104 may be any general radiation detector, examples of which include Thermo FH40GL, GM180, and RAD-7001.

As robot 100 executes the GSO algorithm and moves about an application site, the robot may measure (via sniffer 104) varying concentration values. For example, in a gas leak application, the measured concentration values could represent the ratio of detected gas particles to general air particles in a sample of air. As another example, in a nuclear spill application, concentration values could represent the ratio of radioactive particles incident upon the detector to non-radioactive particles incident upon the detector. Or, the concentration values could represent the frequency of radioactive particles incident upon the detector (e.g., the number of particles per millisecond).

The robot may also encode and broadcast the concentration values to other robots (not shown) in the swarm. As will be described with reference to the GSO algorithm, other robots in the swarm may base certain decisions on the detected broadcast values. A broadcast concentration value may be referred to as a "luciferin value" (so named based on the biological pigment utilized by certain insects to communicate). Robot 100 may employ a number of different luciferin broadcast mechanisms, examples of which include RF mechanisms, audible mechanisms, and/or light emitting mechanisms.

One example of a luciferin broadcast mechanism is illustrated on robot 100 as an array of infrared light emitting diodes (LEDs) 106. The intensity of the LEDs can directly represent the measured concentration value. For example, a high measured concentration value can be represented by a stronger intensity of light emitted from the diodes. Alternatively, the robot 100 may flash or blink the LED, where the frequency of the flashing represents the measured concentration value. For example, a higher frequency of flashing may correspond to a higher measured concentration value.

Robot 100 may also be equipped with a luciferin detection mechanism (not shown used for detecting the luciferin values of other robots in the swarm. The luciferin detection mechanism may, for instance, be a part of sniffer 104, or the detection mechanism may be separately located. In the case where the luciferin value is represented by infrared light, the luciferin detection mechanism could encompass an infrared light detector, for example.

Robot 100 may also incorporate an antenna 108 for communication between the robots in the swarm (or, perhaps other entities, such as stationary computers, satellites, etc.). Antenna 108 could communicate using any known protocol (e.g., Bluetooth, Zigbee, Wi-Fi, etc.), and could communicate to other robots in the swarm such information as: an ID associated with robot 100, robot 100's location, robot 100's bearing and speed, indications of the current terrain, etc. Antenna 108 could be coupled to or otherwise integrated with a GPS receiver (not shown) in order to accurately determine and broadcast location information. Antenna 108 may also be used to broadcast numerical indications of robot 100's luciferin values, either alone or in conjunction with luciferin broadcast mechanism 106.

Figure 2:
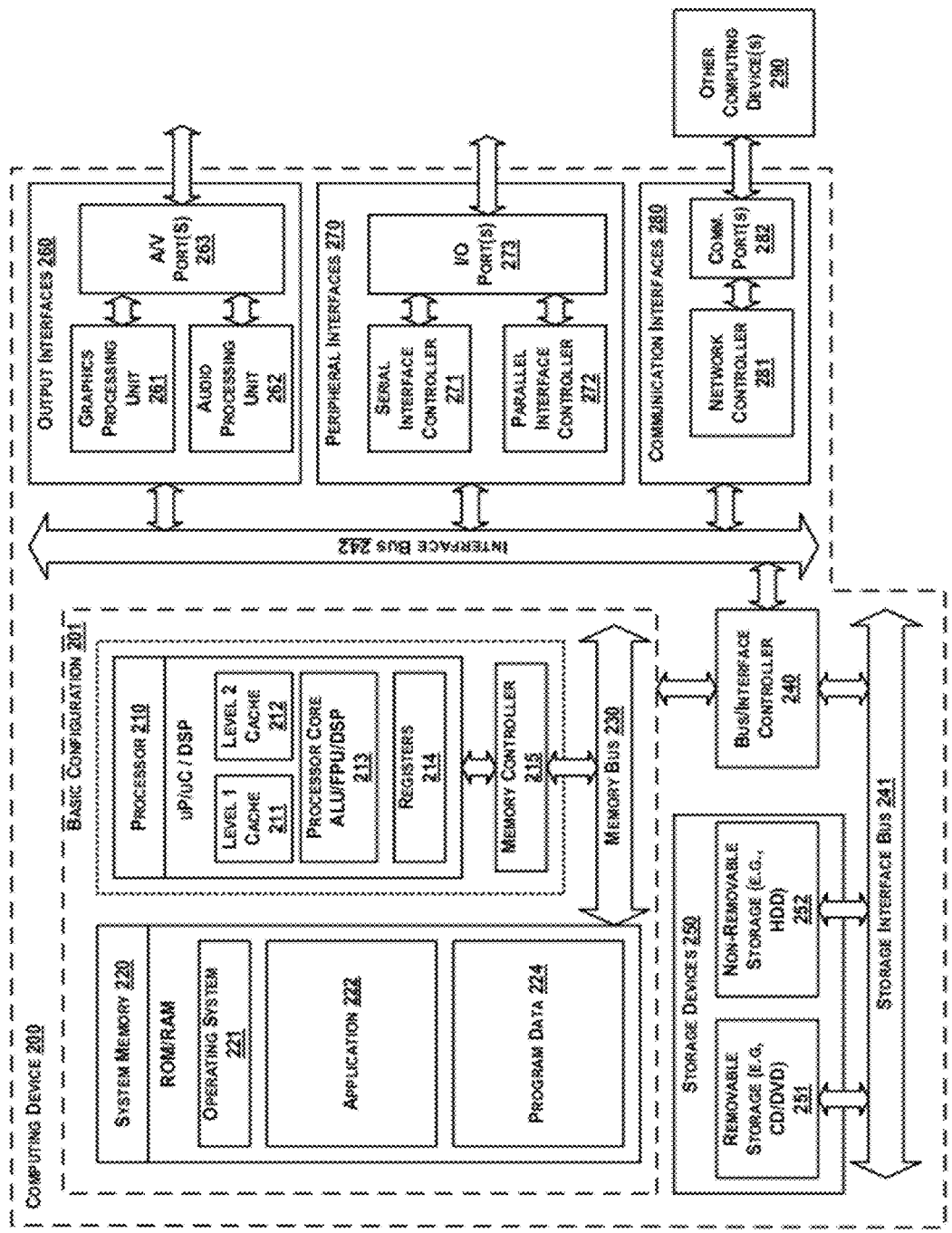
FIG. 2 is a block diagram illustrating an example computing device arranged for generating software instructions to carry out at least some embodiments presented herein.

FIG. 2 is a block diagram illustrating an example computing device 200 that may be associated with robot 100. All or part of computing device 200 may be embedded within robot 100, for example within body area 102. Additionally, computing device 200 may represent a computing device that is designed to communicate with robot 100 (through antenna 108, or through some other means from a remote location (e.g., off-site computers, satellites, etc.).

In a very basic configuration 201, computing device 200 typically includes one or more processors 210 and system memory 220. A memory bus 230 can be used for communicating between the processor 210 and the system memory 220.

Depending on the desired configuration, processor 210 can be of any type including but not limited to a microprocessor (μP), a microcontroller (μC), a digital signal processor (DSP), or any combination thereof. Processor 210 can include one more levels of caching, such as a level one cache 211 and a level two cache 212, a processor core 213, and registers 214. The processor core 213 can include an arithmetic logic unit (ALU), a floating point unit (FPU), a digital signal processing core (DSP Core), or any combination thereof. A memory controller 215 can also be used with the processor 210, or in some implementations the memory controller 215 can be an internal part of the processor 210.

Depending on the desired configuration, the system memory 220 can be of any type including but not limited to volatile memory (such as RAM), non-volatile memory (such as ROM, flash memory, etc.) or any combination thereof. System memory 220 typically includes an operating system 221, one or more applications 222, and program data 224. For example, an application 222 may be designed to receive certain inputs from robot 100 and base decisions off of those inputs. For instance, if application 222 receives a certain input, application 222 may direct another part of computing device 200 to cause the wheels of robot 100 to rotate for a fixed period of time, thus propelling robot 100 forward. Other actions are possible as well and are generally described with reference to the GSO algorithms.

Computing device 200 can have additional features or functionality, and additional interfaces to facilitate communications between the basic configuration 201 and other parts of robot 100 as well as other robots comprising the swarm. For example, a bus/interface controller 210 can be used to facilitate communications between the basic configuration 201 and one or more data storage devices 250 via a storage interface bus 241. The data storage devices 250 can be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 220, removable storage 251 and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media can be part of device 200. Computing device 200 can also include an interface bus 242 for facilitating communication from various interface devices (e.g., output interfaces, peripheral interfaces, communication interfaces, and/or interfaces directly associated with robot 100, such as antenna 108, luciferin broadcast mechanism 106, sniffer 104, etc.) to the basic configuration 201 via the bus/interface controller 240. Example output interfaces 260 include a graphics processing unit 261 and an audio processing unit 262, which can be configured to communicate to various external devices such as a display or speakers via one or more A/V ports 263. Example peripheral interfaces 260 include a serial interface controller 271 or a parallel interface controller 272, which can be configured to communicate with external devices such as input devices (e.g., keyboard, mouse, pen, voice input device, touch input device, etc.) or other peripheral devices (e.g., printer, scanner, etc.) via one or more I/O ports 273. An example communication interface 280 includes a network controller 281, which can be arranged to facilitate communications with one or more other computing devices 290 over a network communication via one or more communication ports 282. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media (or medium) as used herein can include both storage media and communication media.

Computing device 200 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 200 can also be implemented as a personal computer including both laptop computer and non-laptop computer configurations.

Figure 3:
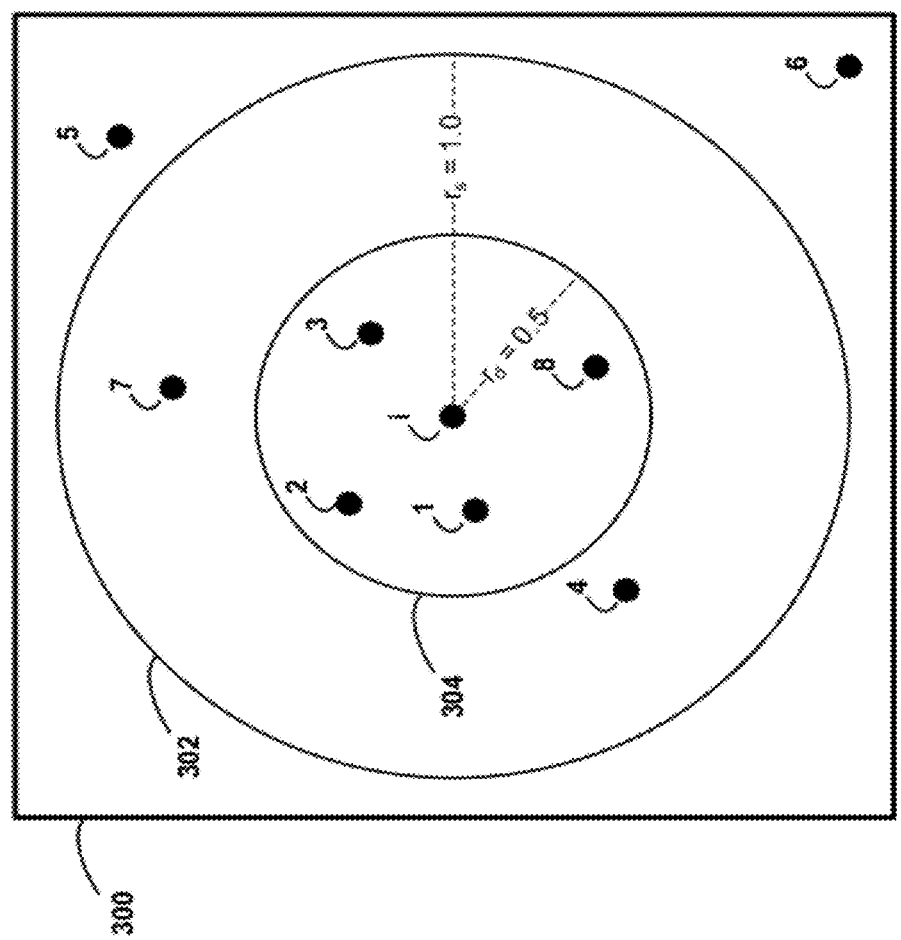
FIG. 3 is an illustration of example application site in which a swarm of robots may carry out at least some of the embodiments presented herein.

FIG. 3 illustrates an example application site 300 where a swarm of robots may be deployed. For example, the swarm operating within site 300 comprises robots i, 1, 2, 3, 4, 5, 6, 7, and 8 (although varying numbers of robots can be used in other examples). Each robot in the swarm may maintain certain parameters while carrying out the GSO algorithm. One such parameter is called a communication range parameter (referred to as a radius $r_s(t)$). The communication range parameter for each particular robot in the swarm may be based at least in part on the range of that particular robot's communication equipment (e.g., antenna 108 or luciferin broadcast mechanism 106) and/or the communication equipment of the other robots in the swarm. Some robots may have identical communication ranges and some may have differing communication ranges. An example communication range for robot i is represented by circle 302 in FIG. 3 and is shown as having an example value of $r_s(t)=1.0$ km. Robots 1, 2, 3, 4, 7, and 8 are shown as being located within robot i's communication range, Another parameter is called a decision range parameter (referred to as a radius $r_d(t)$). The decision range parameter is used by each particular robot in the swarm to determine which other robots fall within a circular area defined by the decision range radius. During execution of the GSO algorithm, further actions can be taken with respect to the robots that fall within the decision range. An example decision range for robot i is represented by circle 304 in FIG. 3 and is shown as having a value of $r_d(t)=0.5$ km. Robots 1, 2, 3, and 8 are shown as being located within robot i's decision range.

The robots that are located within a given robot's decision range may also be considered for inclusion in a neighbor set parameter (referred to as $N_i(t)$). The neighbor set of a given robot may contain robots that both (i) fall within the given robot's decision range, and (ii) satisfy some other condition. For example, the other condition may require that the luciferin value of the other robot be greater than the luciferin value of the given robot. In the example illustrated in FIG. 3, robots 1, 2, 3, and 8 are considered for inclusion in robot i's neighbor set since those robots are located with robot i's decision range. If robots 2, 3, and 8 have higher luciferin values than robot i's luciferin value and if robot 1 has a lower luciferin value than robot i's luciferin value, then robots 2, 3, and 8 (but not robot 1) will be added to robot i's neighbor set.

Figure 4:
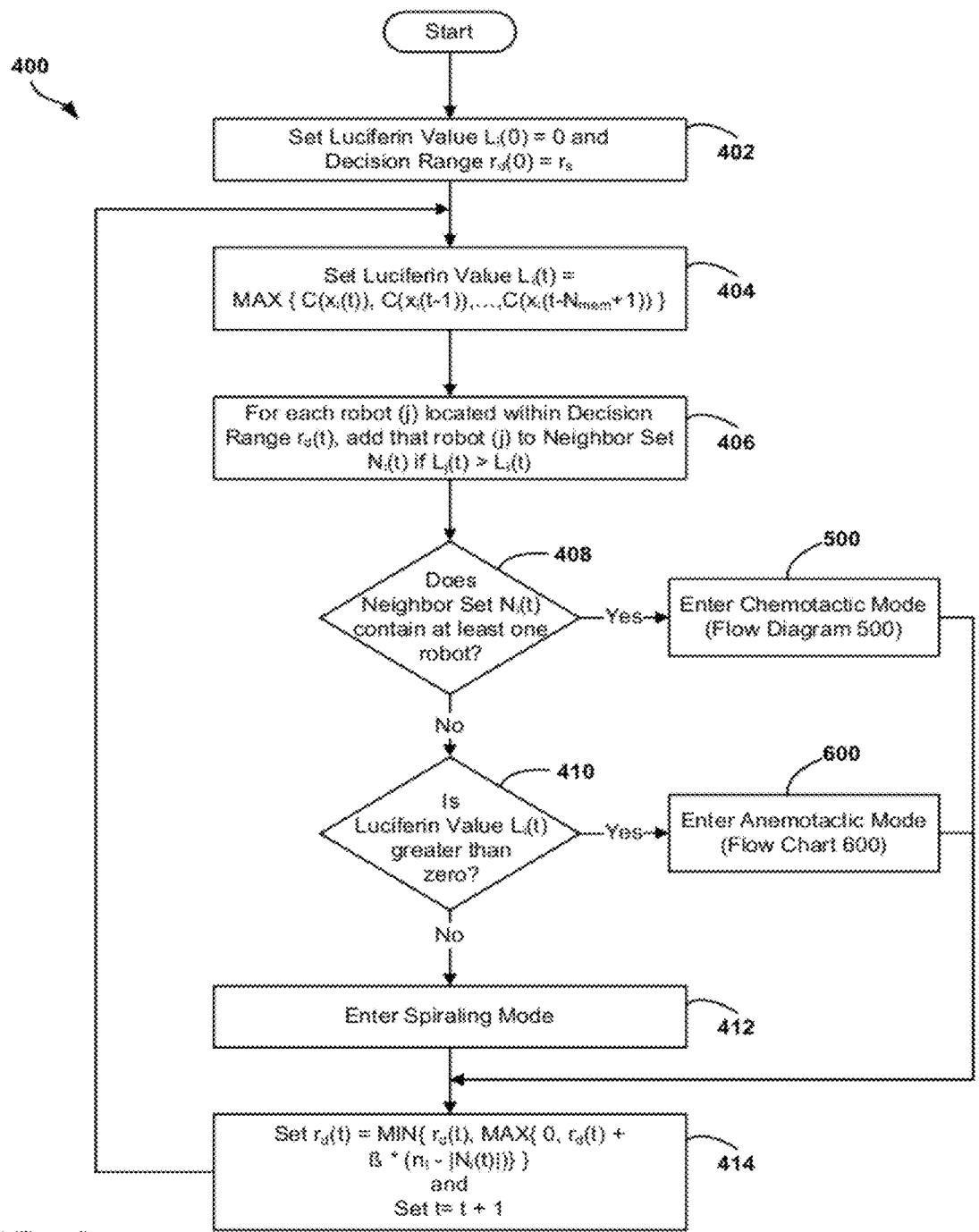
FIG. 4 is a flow diagram illustrating example steps of a Glowworm Swarm Optimization Algorithm that are adapted in accordance with at least some embodiments described, herein.

FIG. 4 is a flow diagram illustrating an example GSO algorithm 400 that a robot may execute in order to help localize an odor source (e.g., a radiation source). Example algorithm 400 may include one or more operations, functions, or actions as illustrated by one or more of blocks 402, 404, 406, 408, 410, 412, and/or 414. It should be understood that the flow diagram 400 (as well as additional flow diagrams described throughout the remainder of this specification) shows functionality and operation of one possible implementation of present embodiments. In this regard, each block of each flow diagram may represent a module, a segment, or a portion of program code, which includes one or more instructions executable by a processor for implementing specific logical functions or steps in the process. The program code may be stored on any type of computer readable medium (e.g., computer readable storage medium or non-transitory media), for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Algorithm 400 is described as being executed by a given robot (referred to as robot "i") of a swarm of robots. Robot i may refer to robot 100, for example. Additionally, one or more other robots of the swarm may be simultaneously executing algorithm 400. However, those reasonably skilled in the art recognize that the functions represented by blocks 402-414 may be executed at different times by robots of a swarm. For example, one robot of a swarm may be executing a function represented by block 404 while another robot may be executing a different function represented by a different block.

Processing for algorithm 400 may begin at block 402 where an initial luciferin value parameter for robot i (referred to as $L_i(0)$) is set to 0 and the initial decision range radius for robot i (referred to as $r_i(0)$) is set equal to robot i's communication range radius (referred to as $r_s$). As mentioned above, robot i may broadcast an indication of the luciferin value $L_i$ via a luciferin broadcast mechanism. For example, if the luciferin broadcast mechanism is an array of LEDs 106, then a frequency of LED blinking can directly represent robot i's luciferin value a blink frequency of 100 Hz may represent a luciferin value of 100 while a blink frequency of 1 kHz may represent a luciferin value of 1000). Alternatively, the intensity of the light emitted by LEDs 106 may represent a normalized version of the luciferin value. For instance, example luciferin values 0-20,000 can be normalized to an example intensity scale of LEDs 106 that ranges from 0-10 candela. And as also mentioned above, other methods of broadcasting luciferin values exist as well and could include, for example, Bluetooth methods, Wi-Fi methods, and/or generic RF methods.

The algorithm continues at block 404 where robot i's luciferin value $L_i(t)$ is set as the maximum measured concentration value of the last $N_{mem}$ concentration values measured by robot i. This may be referred to by the expression:

$$MAX\{C(x_i(t)), C(x_i(t-1)), \ldots, C(x_i(t-N_{mem}+1))\}.$$

$N_{mem}$ may be any whole number (e.g., 50). One reason for setting the luciferin value as the maximum measured concentration value of the last $N_{mem}$ concentration values, rather than setting the luciferin value as the most recent concentration value, is that the most recent measured concentration value may not be an accurate representation of the actual concentration at that location. For example, wind speed may be responsible for the dispersion of certain particles (e.g., radioactive particles). And since wind speed changes frequently, a robot at a certain location may not detect any particles in one instance, and in another instance may detect many particles. Therefore, in order for a robot to more accurately portray the concentration value at a certain location, that robot set the luciferin value equal to the maximum measured concentration value of the last, say 50, instances.

The variable "t" refers to the number of times the algorithm has been executed, which may be referred to as a "time step:" Thus, the first time robot i executes the algorithm, t=1, and robot i is said to be at time step 1. After block 414, the algorithm returns to block 404, at which point t increases by 1.

The expression $x_i(t)$ refers to the position in an application site of robot i at time step t. A robot's position may be indicated, for example, by geographic coordinates (e.g., latitude and longitude) or may be Cartesian coordinates normalized to a reference point. The expression $C(x_i(t))$ refers to the concentration value measured by robot i (e.g., via sniffer 104) at time step t. As mentioned above, measured concentration values may represent the measured ratio in the air of specific particles (e.g., radioactive particles) to generic air particles. Alternatively, the concentration value may represent the frequency of specific particles incident upon the detector.

Continuing at block 406, for each robot, j, located within robot i's decision range radius $r_d(t)$, robot j is added to robot i's neighbor set (referred to as $N_i(t)$) if robot j has a greater luciferin value ($L_j(t)$) than robot i's luciferin value ($L_i(t)$). In other words, each robot that both (i) is located within a circular area defined by robot i's decision range radius, and (ii) has a luciferin value greater than robot i's luciferin value, is added to robot i's neighbor set. If there are no robots located with robot i's decision range, or if there are no robots located within robot i's decision range that have a luciferin greater than robot i's luciferin value, then robot i's neighbor set will be empty.

In order for robot i to learn the locations of the other robots in the swarm, and in order for robot i to determine which robots of the other robots in the swarm are located within robot i's decision range, each robot in a swarm may broadcast its location information to the other robots in the swami. Location information may be broadcast by luciferin broadcast mechanism 106 (e.g., encoded with the broadcast luciferin value), or be transmitted via some other means e.g., antenna 108).

Robots of a swarm may accordingly identify themselves via a number of possible means. For example, prior to the execution of a GSO algorithm (e.g., algorithm 400) each robot of a swarm may be provisioned a robot identifier (ID). These robot IDs may be periodically broadcast (e.g., via luciferin broadcast mechanism 106 or antenna 108) to the other robots of the swarm during execution of the GSO algorithm, perhaps along with location information. Alternatively, a given robot of a swarm may be identified by other robots of the swarm based on the method in which given robot broadcasts its luciferin values. For example, each robot may use a different wavelength of light by which to broadcast luciferin values. Thus, robots may be identified based on the luciferin light wavelength. As another example, each robot may broadcast luciferin values at different blink frequencies, thus robots may be identified based on the luciferin light blink frequency. Other ways of identifying robots in a swarm are possible as well.

Following the neighbor set determination, the algorithm continues at decision block 408 where it is determined whether robot i's neighbor set ($N_i(t)$) contains at least one robot. If yes, then the algorithm continues with a Chemotactic mode, represented by block 500 (and represented by flow diagram 500 in FIG. 5). If no, then the algorithm proceeds to decision block 410 where it is determined if robot i's luciferin value ($L_i(t)$) is greater than zero. If yes, then the algorithm continues with an Anemotactic mode, represented by block 600 (and represented by flow diagram 600 in FIG. 6). If robot i has a luciferin value not greater than zero, then the algorithm continues with a Spiraling mode, represented by block 412.

Figure 7:
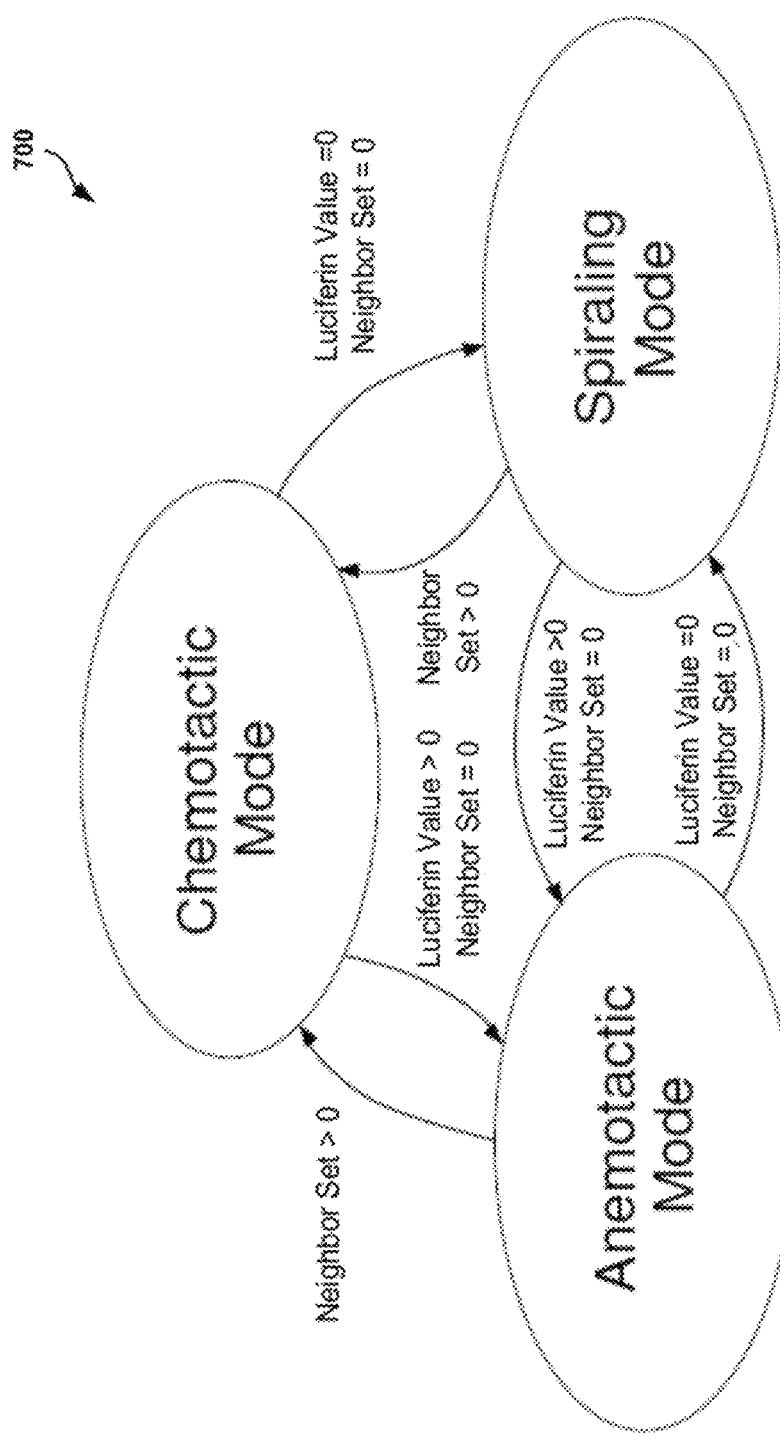
FIG. 7 is an illustration of an example state transition diagram that is adapted in accordance with at least some embodiments presented herein.

The three modes (i.e., Chemotactic mode, Anemotactic mode, and Spiraling mode) and the corresponding criteria for entering these modes are illustrated in FIG. 7 by example state transition diagram 700. The Chemotactic mode is utilized by a given robot to move toward other robots (i.e., neighbors) that have higher luciferin values than the given robot (i.e., move toward the source). A given robot (e.g., robot i) may enter the Chemotactic mode when at least one robot exists in the given robot's neighbor set.

Figure 5:
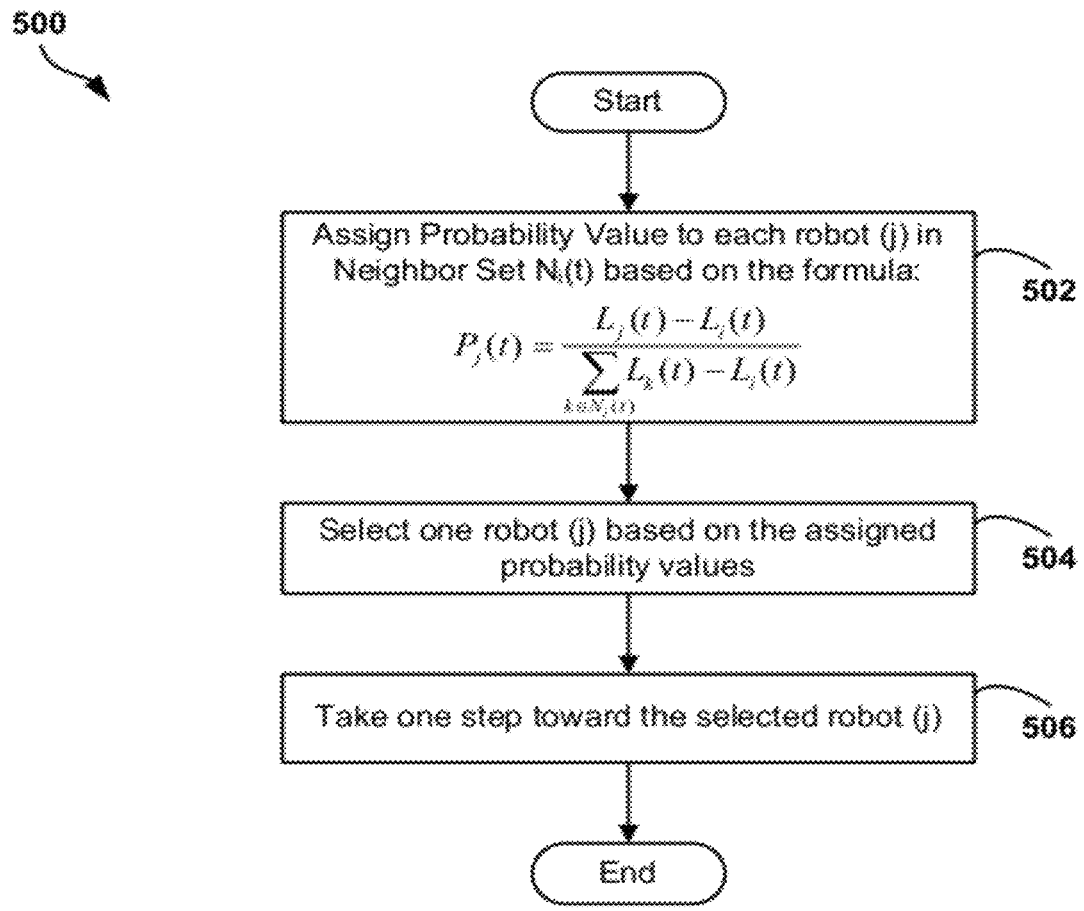
FIG. 5 is a flow diagram illustrating example steps of a Chemotactic mode that are adapted in accordance with at least some embodiments described herein.

FIG. 5 is a flow diagram 500 illustrating example functions that a given robot (e.g., robot i) of a swarm may execute while in the Chemotactic mode. Example functions of flow diagram 500 may include one or more operations or actions as illustrated by one or more of blocks 502, 504, and/or 506. For example, at block 502, a probability value is assigned to each robot (j) in robot i's neighbor set based on the expression:

$$\frac{L_j(t) - L_i(t)}{\sum_{k \in N_i(t)} L_k(t) - L_i(t)},$$

where $L_j(t)$ refers to the luciferin value of a robot j at time step t, $L_i(t)$ refers to the luciferin value of robot i at time step t, and $$\sum_{k \in N_i(t)} L_k(t) - L_i(t)$$

refers to the sum of the differences between luciferin values of each robot in robot i's neighbor set at time step t and the luciferin value of robot i at time step t. In other words, probability values are assigned to the robots of robot i's neighbor set commensurate with each neighbor's broadcast luciferin value.

For example, Table 1 illustrates example luciferin values detected at robot i for robots 1, 2, 3, 4, 5, 6, 7, and 8 of FIG. 3. Robot i's luciferin value is shown as being 10, while robots 2, 3, 4, 7, and 8 are shown as having luciferin values of 20, 15, 15, 2, 19, and 7 respectively. Robots 5 and 6 are shown as not having a detected luciferin value since they are outside of robot i's communication range radius $r_s$. Robots 1, 2, and 3 are neighbors of robot i since they each (i) are located within robot i's decision range radius ($r_d$) and each (ii) have luciferin values that are greater than robot i's luciferin value.

TABLE 1

| Robot | Neighbor? | Luciferin Value |
|---|---|---|
| i | — | 10 |
| 1 | ✓ | 20 |
| 2 | ✓ | 15 |
| 3 | ✓ | 15 |
| 4 | | 2 |
| 5 | | — |
| 6 | | — |
| 7 | | 19 |
| 8 | | 7 |

Table 2 illustrates example probability values of robots 1, 2, and 3 of Table 1 according to the probability expression of block 502. As indicated by Table 1, robot i has an example luciferin value of 10. Therefore, robots 1, 2, and 3 have luciferin differences (compared with robot i's luciferin value) of 10, 5, and 5 respectively. The sum of the luciferin differences is calculated as 10+5+5=20. This translates to probability values of 10/20=50% for robot 1, 5/20=25% for robot 2, and 5/20=25% for robot 3.

TABLE 2

| Robot | Luciferin Value | $L_j(t) - L_i(t)$ | Probability Value |
|---|---|---|---|
| 1 | 20 | 10 | 50% |
| 2 | 15 | 5 | 25% |
| 3 | 15 | 5 | 25% |
| Total: | | 20 | 100% |

Following block 502 is block 504 where robot i selects a robot from the neighbor set based on the probability values assigned at block 504. In the example described, above, robot i would have a 50% chance at selecting robot 1, a 25% chance at selecting robot 2, and a 25% chance at selecting robot 3.

Finally, at block 506, robot i takes one step toward the robot selected at block 504. The direction in which to take a step may be determined by robot i based on location indications received from the other robots, and based on a determination of robot i's location. The size of a step may depend on the size of the application site, and may be, for example on the order of 5-10 centimeters, though other step sizes are possible as well. Probabilistically determining which neighbor to take a step toward, rather than automatically moving toward the neighbor with the highest luciferin value, introduces some randomness in the algorithm and may serve to prevent robots from becoming clustered. Additionally, the randomness provides for the opportunity to localize multiple sources by allowing the robots the chance to spread out during the algorithm. Following block 506, the Chemotactic mode ends and the flow returns to flow diagram 400.

The Anemotactic mode is an exploratory mode and is used by a given robot to search for the source. As shown in FIG. 7, a given robot (e.g., robot i) may enter the Anemotactic mode when no robots exist in robot i's neighbor set, but the given robot has a non-zero luciferin value.

Figure 6:
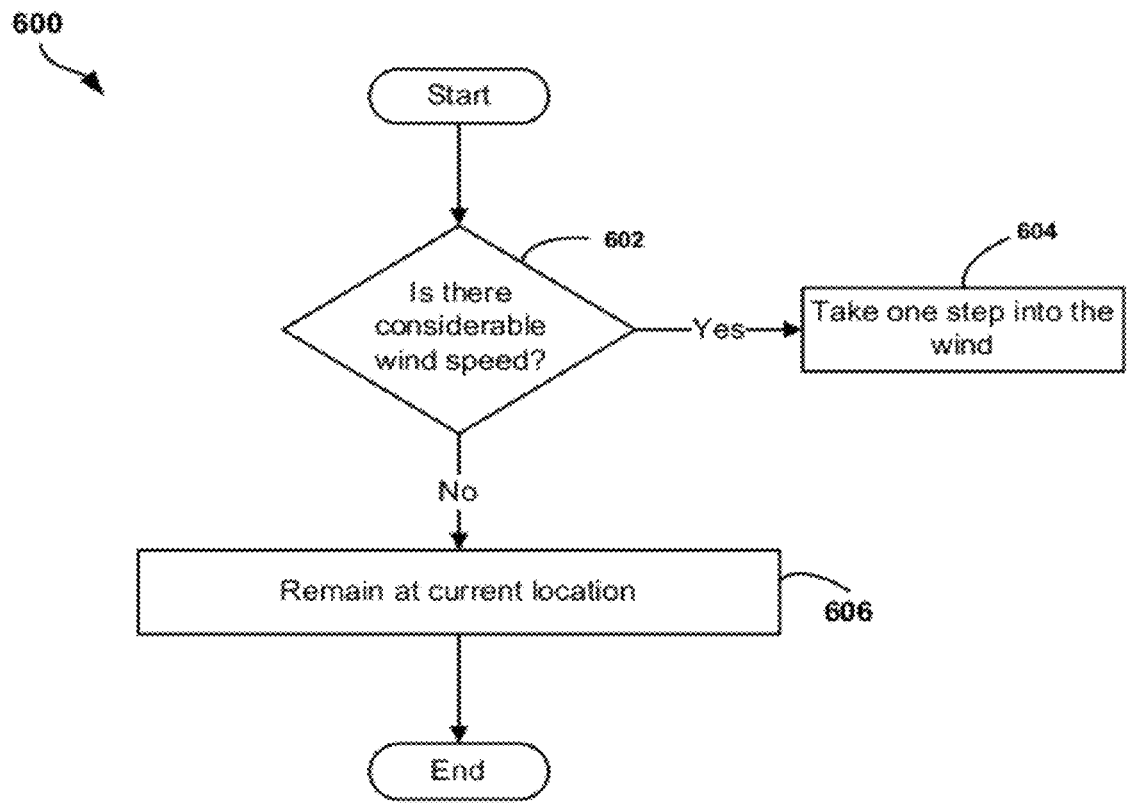
FIG. 6 is a flow diagram illustrating example steps of an Anemotactic mode that are adapted in accordance with at least some embodiments described herein.

FIG. 6 is a flow diagram 600 illustrating example functions that a given robot (e.g., robot i) of a swarm may execute while in the Anemotactic mode. Example functions of flow diagram 600 may include one or more operations or actions as illustrated by one or more of blocks 602, 604, and/or 606. For example, at block 602, a determination is made of whether there is considerable wind speed. Considerable wind speed may refer to a wind speed that is above a threshold wind speed. Robots of a swarm may be equipped with wind gauges, or other means for determining wind speed and/or direction. If at block 602 a determination is made that there is considerable wind speed, the flow continues at block 604 where robot i takes one step into the wind. As noted above, example step sizes arc on the on the order of 5-10 cm and may depend on the size of the application site. Since wind often carries particles considerable distances, moving upwind may allow a robot to move closer to a source.

If at block 602 a determination is made that there is not considerable wind speed, then robot i may remain at the current location. This may allow other robots the chance to detect robot i's presence and move toward robot i in an effort to localize the source. Following block 606, the Anemotactic mode ends and flow returns to flow diagram 400.

The Spiraling mode, like the Anemotactic mode, is also an exploratory mode, however the Spiraling mode represents the condition where a given robot is essentially lost. As shown in FIG. 7, a given robot (e.g., robot i) may enter the Spiraling mode when the given robot does not have any neighbors and when the given robot has a zero luciferin value. In the Spiraling mode, a robot takes a step in an effort to complete a spiral pattern (e.g., a circular spiral or a square spiral) in order to explore the application site and find a neighbor or to detect a concentration. One implementation of a spiral pattern is one in which a robot takes 'x' number steps in a straight line. After x number of steps, the robot may perform a 90° turn and move another x steps, followed by another 90° turn and movements of 2x steps, and so on. The length of the spiral may be incremented by x steps every two turns.

Following the Chemotactic, Anemotactic, or Spiraling mode, flow continues at flow diagram 400 with block 414 where the decision range radius parameter ($r_d(t)$) is updated and the time step is increased by one. The decision range parameter is updated in an effort to balance the size of the decision range radius with a given robot's desired number of neighbors (represented by the parameter $n_t$). For example, if the number of robots in robot i's neighbor set (which is represented by the parameter $|N_i(t)|$) is smaller than the number of desired neighbors, then robot i's decision range radius may be increased. If the number of robots in robot i's neighbor set is greater than the number of desired neighbors, then robot i's decision range radius may be decreased. To increase or decrease the decision range radius at block 414, the decision range radius is set equal to the smaller of (i) the communication range radius and (ii) the larger of (a) zero and (b) the current decision range radius plus a growth parameter multiplied by the desired number of neighbors less the neighbor set size. This is given by the expression:

$$MIN\{r_s, MAX\{0, r_d(t) + \beta^*(n_1 - |N_i(t)|)\}\}.$$

The growth parameter (referred to as $\beta$), which may, for example, be on the order of 0.4, controls how big or small of a change the radius parameter undergoes each time step.

Following block 414, the flow returns to step 404 and may continue on through block 406, 408, and/or blocks 410, 500, 600, 412, and/or 414.

Figure 8:
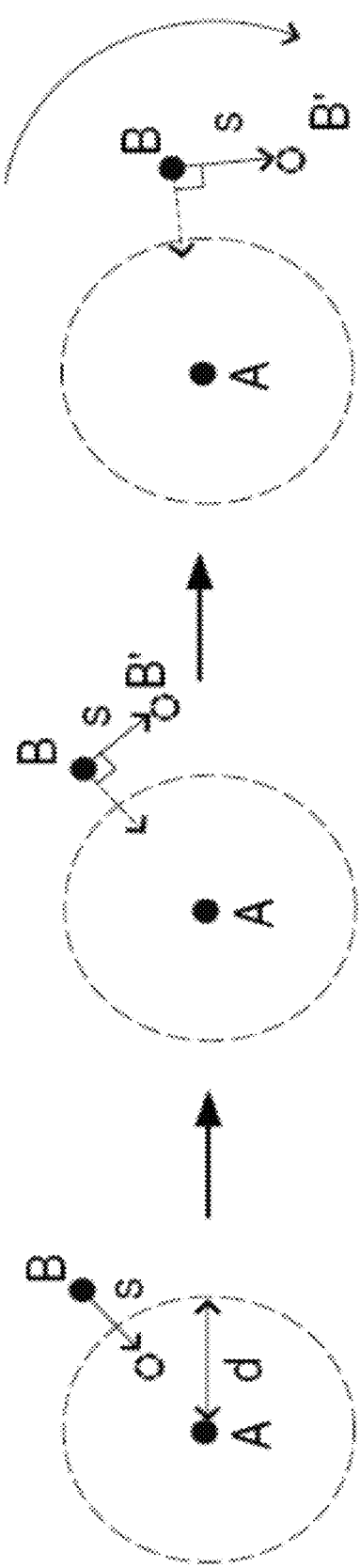
FIG. 8 is an illustration of example obstacle avoidance maneuvers.

FIG. 8 illustrates example obstacle avoidance maneuvers that robots of a swarm may employ. Utilization of obstacle avoidance techniques by robots of a swarm may reduce the occurrence of gird lock situations and/or collisions. In one type of obstacle avoidance maneuver, when a given robot's path comes within an obstacle avoidance distance of another robot (or some other object), the given robot will take a step in the perpendicular direction. For example, in FIG. 8, robot B may be a robot operating in the Chemotactic mode and may desire to take a step toward robot A (which may be operating in the Anemotactic mode). But since robot B's path will take it within an obstacle avoidance distance, d, of robot A, robot B instead takes a step in the perpendicular direction. This results in robot B moving to location B'. In the next time step, robot B again desires to take a step toward robot A, but again this will place robot B within the obstacle avoidance distance, d, of Robot A. So robot B takes a step in the perpendicular direction. Continuing in this manner after a number of steps, robot B essentially circles robot A. This circling behavior may in fact add a type of explorative component to the GSO algorithm. The obstacle avoidance distance may depend on the step size used. For example, the obstacle avoidance distance may be about twice the distance of the step size, however other distances are possible as well.

Figure 9:
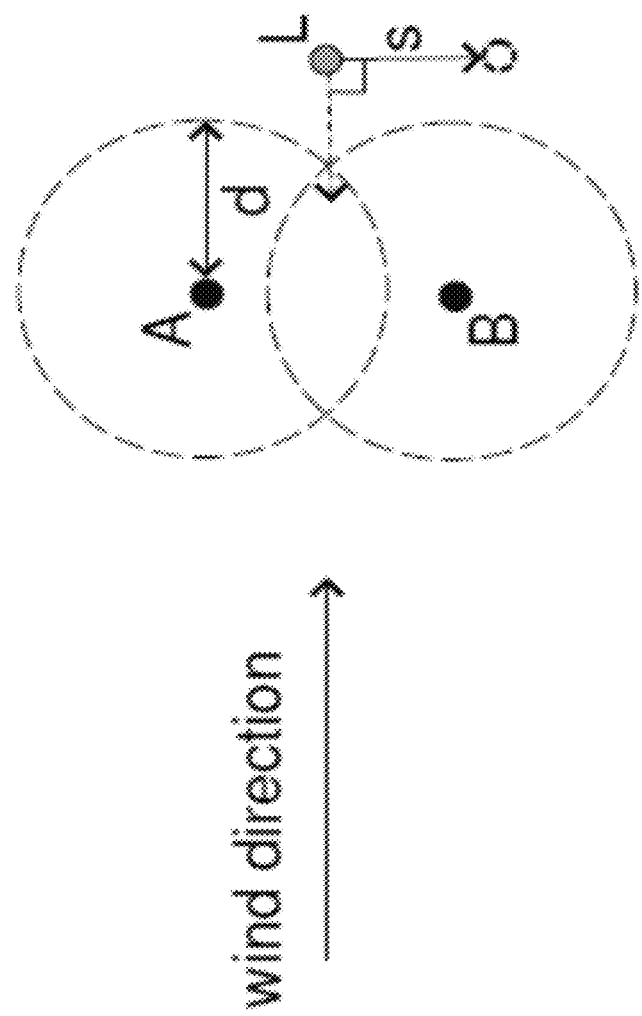
FIG. 9 is another illustration of example obstacle avoidance maneuvers.

One problem that may arise when implementing obstacle avoidance maneuvers is that convergence times to the location of the source (e.g., a radiation source) are significantly delayed. FIG. 9 illustrates an example of a situation that may contribute to a delay in localizing the source. Robot L represents a robot having the highest luciferin value. Since the robot with the highest luciferin value has no neighbors, robot L enters the Anemotactic mode and attempts to take a step into the wind. This step, however, will bring robot L within the obstacle avoidance distance, d, of either robot A or robot B. Accordingly, robot L may take a step in the perpendicular direction. In the meantime, robots A and B may be operating in the Chemotactic mode and consequently, they may be attempting to take steps toward robot L as robot L moves in the perpendicular direction. This further delays localizing the source.

One way to solve this problem is to have a given robot implement larger obstacle avoidance distances depending on which other robot is in the given robot's path. For example, if a robot B is operating in the Chemotactic mode and is being attracted toward a robot A, obstacle avoidance maneuvers may be implemented in robot B at a larger distance from robot A, say $N_1$ times d. If, however, robot A was not attracting robot B, but one merely in robot B's path, then robot B may implement obstacle avoidance maneuvers at a distance d. Using larger obstacle avoidance distances results in robots of a swarm spreading out, thus minimizing anemotactic hindrance.

Figure 10C:
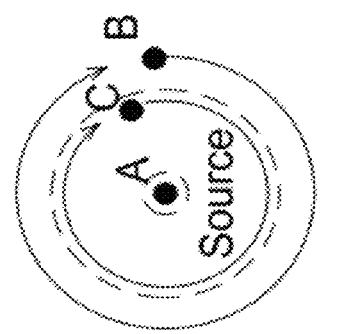
FIGS. 10A-C illustrate an example swarm of robots localizing a source in the absence of wind.
Figure 10B:
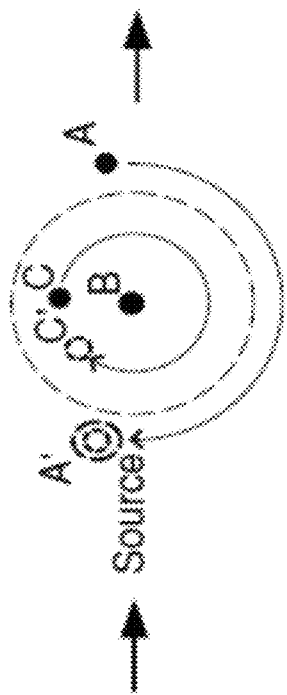
Figure 10A:
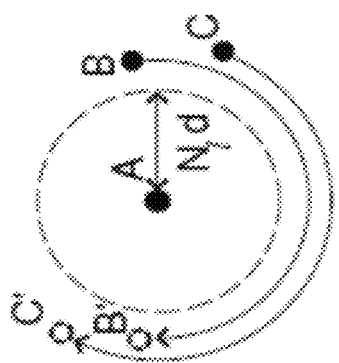

FIGS. 10A-C illustrate an example method of robots A, B, and C locating a source (e.g., a radiation source) in an environment with little to no wind (e.g., an indoor environment). Due to the absence of wind, the robot with the highest detected luciferin value (which operates in the Anemotactic mode) will not be able to take a step upwind. Instead, that robot will remain in its current location while other, Chemotactic, robots approach and circle around the Anemotactic robot until they detect the highest luciferin value.

For example, in FIG. 10A robot A is detecting the highest luciferin value and is consequently operating in the Anemotactic mode. Robots B and C are thus attracted to robot A and attempt to take steps toward robot A. They may eventually encounter the obstacle avoidance distance and begin to circle around robot A until they reach positions B' and C' respectively. In FIG. 10B, robot B has detected the highest luciferin value, and as such, robots A and C are attracted to robot B and may attempt to take steps toward robot B. Once they encounter the obstacle avoidance distance, robots A and C will circle around robot B. Eventually, in FIG. 10C, robot A encounters the source and robots B and C continually circle around robot A. This continual circulation of robots around a central robot may serve as a visual indication to a site operator that the source has been localized.

Figure 11:
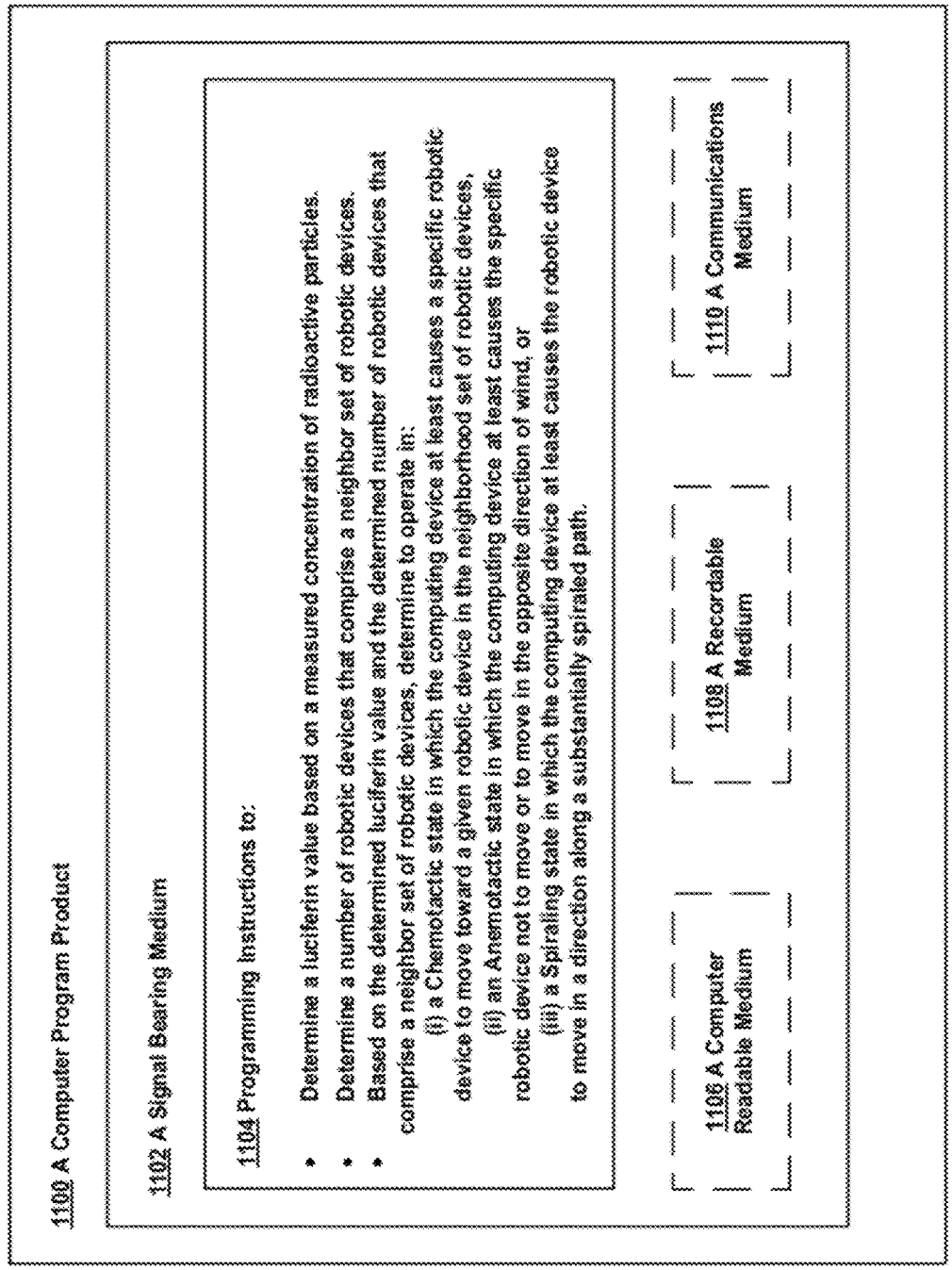
FIG. 11 is a schematic illustrating a partial view of an example computer program product that includes a computer program for executing a computer process on a computing device, arranged according to at least some embodiments presented herein.

FIG. 11 is a schematic illustrating a conceptual partial view of an example computer program product 1100 that includes a computer program for executing a computer process on a computing device, arranged according to at least some embodiments presented herein. An illustrative embodiment of the example computer program product 1100 is provided using a signal bearing medium 1102. Signal bearing medium 1102 may include one or more instructions 1104 that, when executed by, for example, a processor, may provide the functionality or portions of the functionality described above with respect to FIGS. 1-10. Thus, for example, referring to flow diagram 400, one or more features of blocks 402, 404, 406, 408, 410, 412, and/or 414 of FIG. 4 may be undertaken by one or more instructions associated with signal bearing medium 1102. The one or more instructions may be, for example, computer executable and/or logic implemented instructions. In some embodiments, the signal bearing medium 1102 of the one or more computer program products 1100 include a computer readable medium 1106, a recordable medium 1108, and/or a communications medium 1110. In some examples, a computing device such as computing device 200 of FIG. 2 may be configured to provide the various operations, function, or actions in response to instructions 1104 conveyed to device 200 by medium 1002.

In some implementations, signal bearing medium 1102 may encompass a computer-readable medium 1106, such as, but not limited to, a hard disk drive, a Compact Disc (CD), a Digital Video Disk (DVD), a digital tape, memory, etc. In sonic implementations, signal bearing medium 1102 may encompass a recordable medium 1108, such as, but not limited to, memory, read/write (R/W) CDs, R/W DVDs, etc. In some implementations, signal bearing medium 1102 may encompass a communications medium 1110, such as, but not limited to, a digital and/or an analog communication medium (e.g., a fiber optic cable, a waveguide, a wired communications link, a wireless communication link, etc.). Thus, for example, computer program product 1100 may be conveyed to one or more modules of the described systems by an RF signal bearing medium 1102, where the signal bearing medium 1102 is conveyed by a wireless form of communications medium 1110 (e.g., a wireless communications medium conforming with the IEEE 802.11 standard).

The present disclosure is not to he limited in terms of the particular embodiments described, in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to he limited only by the terms of the appended claims, along with the full scope of equivalents to which such claims are entitled. It is to be understood that this disclosure is not limited to particular methods, reagents, compounds, compositions, or materials, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited, to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include hut not be limited to systems that have A alone, B alone, C alone, A and B together, A and C together, B and C together, and/or A, B, and C together, etc.). It will be farther understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. At a robotic device, a method for searching for a radiation source, the method comprising:
   measuring a concentration of radioactive particles;
   determining a luciferin value based at least in part on the measured concentration of radioactive particles;

determining a number of other robotic devices that comprise a neighbor set of robotic devices; and based on the determined luciferin value and the determined number of other robotic devices that comprise the neighbor set, operating in a Chemotactic state, an Anemotactic state, or a Spiraling state, wherein operating in the Chemotactic state comprises the robotic device (a) assigning a probability value to each given robotic device in the neighbor set of robotic devices, each assigned probability value being based on the difference between a luciferin value broadcast by the given robotic device and the determined luciferin value, (b) the robotic device selecting, based on the assigned probability values, a given robotic device from among the neighbor set of robotic devices, and (c) the robotic device taking a step toward a location of the selected robotic device, wherein operating in the Anemotactic state comprises the robotic device making a determination that a current wind has a speed greater than a threshold wind speed and responsively taking a step in the opposite direction of the wind, and wherein operating in the Spiraling state comprises the robotic device taking a step along a substantially spiraled path.

2. The method of claim 1, wherein the concentration of radioactive particles comprises (i) a frequency of radioactive particles incident upon a detector, or (ii) a ratio of a number of detected radioactive particles to a number of detected non-radioactive particles.

3. The method of claim 1, further comprising periodically measuring a concentration of radioactive particles, wherein the luciferin value is the maximum of a threshold number of periodically measured concentration values.

4. The method of claim 1, wherein determining the number of other robotic devices that comprise a neighbor set of robotic devices comprises determining the number of other robotic devices that are both (i) located within a circular area defined by a decision radius parameter, and (ii) broadcasting a luciferin value greater than the determined luciferin value.

5. The method of claim 1, wherein the robotic device operates in the Chemotactic state when the determined number of robotic devices that comprise a neighbor set of robotic devices is greater than zero.

6. The method of claim 1, wherein the robotic device operates in the Anemotactic state when both (i) the determined number of other robotic devices that comprise a neighbor set of robotic devices is zero, and (ii) the determined luciferin value is non-zero.

7. The method of claim 1, wherein the robotic device operates in the Spiraling state when both (i) the determined number of other robotic devices that comprise a neighbor set of robotic devices is zero, and (ii) the determined luciferin value is zero.

8. A computer readable storage medium (CRM) having instructions stored thereon, which when executed by a computing device, causes the computing device to perform functions, the functions comprising:

determining a luciferin value based on a measured concentration of radioactive particles;

determining a number of robotic devices that comprise a neighbor set of robotic devices;

based on the determined luciferin value and the determined number of robotic devices that comprise a neighbor set of robotic devices, determining to operate in one of:

(i) a Chemotactic state in which the computing device at least causes a specific robotic device to:

assign a probability value to each given robotic device in the neighbor set of robotic devices, each assigned probability value being based on the difference between a luciferin value broadcast by the given robotic device and the determined luciferin value, select, based on the assigned probability values, a given robotic device from among the neighbor set of robotic devices, and take a step toward a location of the selected robotic device, (ii) an Anemotactic state in which the computing device at least causes the specific robotic device to make a determination that a current wind has a speed greater than a threshold wind speed and responsively taking a step in the opposite direction of the wind, and (iii) a Spiraling state in which the computing device at least causes the robotic device to move in a direction along a substantially spiraled path;

operating in the Chemotactic state;

operating in the Anemotactic state; and operating in the Spiraling state.

9. The CRM of claim 8, wherein determining the number of robotic devices that comprise a neighbor set of robotic devices comprises determining the number of robotic devices that are both (i) located within a circular area defined by a decision radius parameter, and (ii) broadcasting a luciferin value greater than the determined luciferin value.

10. The CRM of claim 8, wherein the functions further comprise determining to operate in the Chemotactic state when the determined number of robotic devices that comprise a neighbor set of robotic devices is greater than zero.

11. The CRM of claim 8, wherein the functions further comprise determining to operate in the Anemotactic state when both (i) the determined number of robotic devices that comprise a neighbor set of robotic devices is zero, and (ii) the determined luciferin value is non-zero.

12. The CRM of claim 8, wherein the functions further comprise determining to operate in the Spiraling state when both (i) the determined number of robotic devices that comprise a neighbor set of robotic devices is zero, and (ii) the determined luciferin value is zero.

13. A robotic device comprising:

a computing device;

memory storage coupled to the computing device; and instructions stored in the memory storage, which when executed by the computing device, cause the robotic device to carry out functions, the functions comprising:

measuring a concentration of radioactive particles;

determining a luciferin value based at least in part on the measured concentration of radioactive particles;

determining a number of other robotic devices that comprise a neighbor set of robotic devices;

based on the determined luciferin value and the determined number of robotic devices that comprise a neighbor set of robotic devices, operating in a Chemotactic state;

based on the determined luciferin value and the determined number of robotic devices that comprise a neighbor set of robotic devices, operating in an Anemotactic state; and based on the determined luciferin value and the determined number of robotic devices that comprise a neighbor set of robotic devices, operating in a Spiraling state, wherein operating in the Chemotactic state comprises the robotic device: assigning a probability value to each given robotic device in the neighbor set of robotic devices, each assigned probability value being based on the difference between a luciferin value broadcast by the given robotic device and the determined luciferin value, selecting, based on the assigned probability values, a given robotic device from among the neighbor set of robotic devices, and taking a step toward a location of the selected robotic device, wherein operating in the Anemotactic state comprises the robotic device making a determination that a current wind has a speed greater than a threshold wind speed and responsively taking a step in the opposite direction of the wind, and wherein operating in the Spiraling state comprises the robotic device moving in a direction along a substantially spiraled path.

14. The robotic device of claim 13, further comprising means for broadcasting the determined luciferin value to other robotic devices.

15. The robotic device of claim 13, wherein the functions further comprise:

operating in the Chemotactic state when the determined number of robotic devices that comprise a neighbor set of robotic devices is greater than zero;

operating in the Anemotactic state when both (i) the determined number of robotic devices that comprise a neighbor set of robotic devices is zero, and (ii) the determined luciferin value is non-zero; and operating in the Spiraling state when both (i) the determined number of robotic devices that comprise a neighbor set of robotic devices is zero, and (ii) the determined luciferin value is zero.

\* \* \* \* \*

UNITED STATES PATENT AND TRADEMARK OFFICE
CERTIFICATE OF CORRECTION

PATENT NO. : 8,838,271 B2
APPLICATION NO. : 13/390662
DATED : September 16, 2014
INVENTOR(S) : Ghose et al.

Page 1 of 2

It is certified that error appears in the above-identified patent and that said Letters Patent is hereby corrected as shown below:

In the Specification

In Column 1, Line 12, delete "35 U.S.C. 371" and insert -- 35 U.S.C. § 371 --, therefor.

In Column 1, Line 44, delete "pulverized," and insert -- pulverized --, therefor.

In Column 2, Line 36, delete "described," and insert -- described --, therefor.

In Column 2, Line 50, delete "maneuvers," and insert -- maneuvers. --, therefor.

In Column 3, Line 19, delete "site" and insert -- site, --, therefor.

In Column 3, Line 27, delete "employed," and insert -- employed --, therefor.

In Column 3, Line 46, delete "will he" and insert -- will be --, therefor.

In Column 4, Line 19, delete "shown" and insert -- shown) --, therefor.

In Column 4, Line 46, delete "means" and insert -- means) --, therefor.

In Column 5, Line 16, delete "controller 210" and insert -- controller 240 --, therefor.

In Column 6, Line 37, delete "range," and insert -- range. --, therefor.

In Column 7, Line 40, delete "value" and insert -- value (e.g., --, therefor.

In Column 8, Line 38, delete "swami." and insert -- swarm. --, therefor.

In Column 8, Line 41, delete "e.g.," and insert -- (e.g., --, therefor.

In Column 10, Line 20, delete "described," and insert -- described --, therefor.

In Column 10, Line 44, delete "anon-zero" and insert -- a non-zero --, therefor.

In Column 10, Line 58, delete "sizes arc" and insert -- sizes are --, therefor.

In Column 13, Line 14, delete "sonic" and insert -- some --, therefor.

In Column 13, Line 28, delete "to he" and insert -- to be --, therefor.

In Column 13, Line 29, delete "described," and insert -- described --, therefor.

In Column 13, Line 38, delete "to he" and insert -- to be --, therefor.

In Column 14, Line 20, delete "limited," and insert -- limited --, therefor.

Signed and Sealed this
Seventeenth Day of March, 2015

Michelle K. Lee
*Director of the United States Patent and Trademark Office*

In Column 14, Line 26, delete "hut" and insert -- but --, therefor.

In Column 14, Line 54, delete "2, 3," and insert -- 1, 2, 3, --, therefor.